US006575834B1

(12) United States Patent
Lindo

(10) Patent No.: US 6,575,834 B1
(45) Date of Patent: Jun. 10, 2003

(54) SYSTEM AND METHOD FOR REMOTE ROULETTE AND OTHER GAME PLAY USING GAME TABLE AT A CASINO

(75) Inventor: Herbert Lindo, Mineola, NY (US)

(73) Assignee: Kenilworth Systems Corporation, Mineola, NY (US)

( * ) Notice: Subject to any disclaimer, the term of this patent is extended or adjusted under 35 U.S.C. 154(b) by 0 days.

(21) Appl. No.: 09/636,168

(22) Filed: Aug. 10, 2000

(51) Int. Cl.$^{7}$ .................................................. A63F 13/00

(52) U.S. Cl. ............................. 463/40; 463/17; 463/25; 463/42

(58) Field of Search ............................... 463/16–17, 42, 463/20–25; 273/142 R, 142 B, 138.2, 138 R, 138 A, 138.1; 725/1, 63–64, 74, 78, 82–83, 86–87, 105, 133; 455/3.01

(56) References Cited

U.S. PATENT DOCUMENTS 3,810,627 A * 5/1974 Levy .......................... 273/138
3,909,002 A * 9/1975 Levy .......................... 273/138
4,339,798 A * 7/1982 Hedges et al. .............. 364/412
4,357,015 A * 11/1982 Santora et al. .......... 273/142 E
4,467,424 A * 8/1984 Hedges et al. .............. 364/412
4,531,187 A * 7/1985 Uhland ....................... 364/412
5,069,453 A * 12/1991 Koza et al. ................. 235/380
5,588,650 A * 12/1996 Eman et al. ............ 273/142 B
5,762,552 A * 6/1998 Vuong et al. ................. 463/25
5,770,533 A * 6/1998 Franchi ....................... 463/16
5,775,993 A * 7/1998 Fentz et al. .................... 463/17
5,800,268 A 9/1998 Molnick
5,871,398 A * 2/1999 Scheier et al. ................ 463/16
5,924,926 A * 7/1999 Brown ........................ 463/11
6,104,815 A * 8/2000 Alcorn et al. ............... 380/251
6,165,069 A * 12/2000 Sines et al. ................... 463/12
6,234,898 B1 * 5/2001 Belamant et al. ............. 463/16

OTHER PUBLICATIONS

Golden Palace Online Casino, 1997 copyright □□□□ Internet site www.goldenpalace.com, 16 pages.*
Booklet "Roulabette": 3 photos and brochure of 7 pages including page titled introduction and 6 pages of description titled "The Roulebette Terminal".

* cited by examiner

*Primary Examiner*—S. Thomas Hughes
*Assistant Examiner*—Alex F. R. P. Rada, II
(74) *Attorney, Agent, or Firm*—Gordon D. Coplein

(57) ABSTRACT

A system and method for playing a table type game such as roulette or dice in an interactive manner at a site remote from the actual casino table in which a camera follows a game that is being played at a table in a casino and a microphone can also pick up the sound of the players at the table and the game play. Terminals at various locations in the casino remote from the table, or various devices such as a personal computer at other remote locations, receive the video display of the game play and the players, as well as game results and game betting status signals from a distribution device that can be closed circuit, wireless satellite or Internet. The remote terminal or device displays a picture (video) of the actual casino table where the game is being played and also contains its own computer (microprocessor) that has various functions which include the generation and display of an electronic representation of a table betting grid. The player at a terminal uses a touch type keypad or at a remote device uses a mouse to electronically places a bet. The remote terminal or device microprocessor is programmed with the required information of odds to pay off when the player makes a winning bet. The terminal or device maintains a running status of the player's account.

19 Claims, 2 Drawing Sheets

SYSTEM AND METHOD FOR REMOTE ROULETTE AND OTHER GAME PLAY USING GAME TABLE AT A CASINO

FIELD OF THE INVENTION

The present invention relates to the playing of casino table type games such as roulette, dice and cards, from remote locations while viewing actual games being played at a casino or similar location.

BACKGROUND OF THE INVENTION

One of the games played in a casino is roulette. This game is played at a table around which a number of players sit or stand and bet by placing chips on a betting grid of numbers in blocks, intersections of blocks, black and red plays and odd and even number selections. A wheel is spun and a ball falls into a numbered pocket as the wheel stops thereby determining the winner of the game who is paid off at various odds depending upon the type of bet placed. Such a game is played at casinos throughout the world. There is usually a considerable amount of interest and excitement around the table as the game is played.

The game of roulette is also played via the Internet. Here there is a computer generated simulation of the roulette table betting grid and spinning wheel. This type of game originates from any location capable of housing the computer and having the necessary telecommunication connections. The player can play the game for fun only or make wagers over the Internet such as by establishing and using a credit card account. While the Internet and other telecommunication media can permit playing roulette from any location in the world having the necessary equipment, this type of play suffers from not having the spontaneity and excitement that comes with watching and participating in an actual game being played in a live casino setting.

A similar situation exists with other casino table games such as blackjack, dice and baccarat. In each of these games players place bets on a table and there is player interaction as the game is played as well as reaction in the crowd watching.

U.S. Pat. No. 5,800,268, granted Sep. 1, 1998 and titled Method of Participating in a Live Casino Game from a Remote Location describes a method by which a player may participate in a live casino game from a location remote from the casino. A player establishes an information link with a casino from an interface station including a video monitor and keypad. In response to the player's entry of financial account information, the casino establishes an information line with the player's financial institution. The casino assigns the player to a gaming table at which a "live" game is occurring, transmitting all images of game play and instructions to the player. The player transmits bet and game play information to the casino. Because of the open line between the casino and player's financial institution, bets are checked, winnings paid, and losses debited. While this method permits a view of a live game, it is somewhat complicated in that the casino requires a central computer to keep track of all the accounts and to communicate with each terminal. If the central computer fails, then all of the remote terminals also fail. There also must be communication between the casino and a third party financial institution. This method also places an added burden on the casino to maintain the various devices, wagers and accounts.

BRIEF DESCRIPTION OF THE INVENTION

The present invention is directed to a system and method for playing a roulette game in an interactive manner at a site remote from the actual casino table while still having a view of and experiencing the live casino action where the game is being played. In accordance with the invention a camera follows a game that is being played at a roulette table in a casino. A microphone can also pick up the sound of the players at the table and the game play.

In one embodiment of the invention, terminals are provided at various locations in the casino remote from the table. The terminals are connected to a distribution device that provides the necessary communication between the players at the remote terminals and the game being played at the casino table.

A remote terminal accepts cash or credit cards to set up an account for the player. The remote terminal displays a picture (video) of the actual casino table where the game is being played. The remote terminal also contains its own computer (microprocessor) that has various functions. Among these are the generation and display of an electronic representation of the table betting grid, this display also preferably having a touch type keypad. The player at the terminal uses the keypad and electronically places a bet on the computer representation of the table betting grid under the casino (house) roulette rules in the normal manner. He also uses the touchpad to select the amount of the bet to be placed. The remote terminal microprocessor is programmed with the required information of odds to pay off when the player makes a winning bet.

At the casino table the croupier conducts the game in the normal manner. At a given time, normally just before or when the ball is placed in the spinning wheel, no more bets are accepted. This is signaled to the computers at the remote terminals which locks out the players at these terminals from placing any more bets. The players at the remote terminals can watch the actual game play at the casino table and the reactions of the players. When the ball drops in the wheel pocket and the game at the casino is finished, the player sees the winning number result. The result also is also made available electronically at the remote terminals.

In a preferred embodiment of the invention, the remote terminal microprocessor maintains the terminal player account balance information. Upon the result of the game winning number being transmitted to the remote terminal, the terminal microprocessor make a calculation against the bet made. If the bet was a loss, then the amount of the bet is subtracted from the player's account. If the bet was a win, the amount of the win is calculated at the usual casino odds, or at some other odds as set, and the appropriate amount of the win is credited to the player's account.

Another embodiment of the invention is directed to players who are not at the casino and, effectively, can be located anywhere in the world. Here, the game being played at the casino is followed by the camera and the picture of the game play and results are transmitted via telecommunications to remote locations. The transmission mode can be the Internet, satellite or other wired or wireless communication system, to players who play the roulette games using devices such as personal computers or modalities such as a TV set connected to the Internet with control boxes such as offered by WEBTV or AOLTV. The devices can be either of stationary type or of the portable type which can communicate by wireless. A program can be installed in or downloaded to the remote player's device that has the features of the previously described casino remote terminal, such as betting odds calculation, generation and display of a betting grid, placing a bet on the grid, etc. In the following description and claims the term remote terminal includes such devices and a description of differences is given where pertinent.

In the remote player embodiment also, the game being played at the casino is viewed and the game play sounds heard by the player at the remote location. The player maintains an account preferably at his own device that can have access to a central computer such as at a bank or credit card company in communication with the player's device. The player follows the table game by viewing the transmission from the camera. When a game is completed at the casino the result is transmitted and the player's computer makes the necessary win and loss calculations based upon the result of the game and this is entered in the player's account at his device.

In each of the embodiments of the invention a player who is not at the casino table experiences the actual table play and crowd response and is able to make wagers without having to be physically present at the game table in the casino. The results of a bet are computed at the location of the player and the player is presented with a running total of his account so he can see the results of his wager and monitor the amount wagered.

The invention is applicable to other types of casino games played at a table such as blackjack, dice, baccarat and similar games.

OBJECTS OF THE INVENTION

An object of the invention is to provide a system and method that allows players to play roulette and other casino table type games at remote locations while following an actual game that is being played at a casino table and using the results of the casino game to determine betting results.

Another object is to provide a system and method for playing roulette and other casino table type games in Which a player at a terminal or other device remote from a game played at a casino game table follows the game at the casino table, and with a computer located at the terminal or device places bets and computations are made of the winnings and losses as the actual game is played.

Another object is to provide a method and system for viewing a roulette or other table game played at a casino from a remote location from which bets are made and wins and losses are adjusted against an account balance of the remote player.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
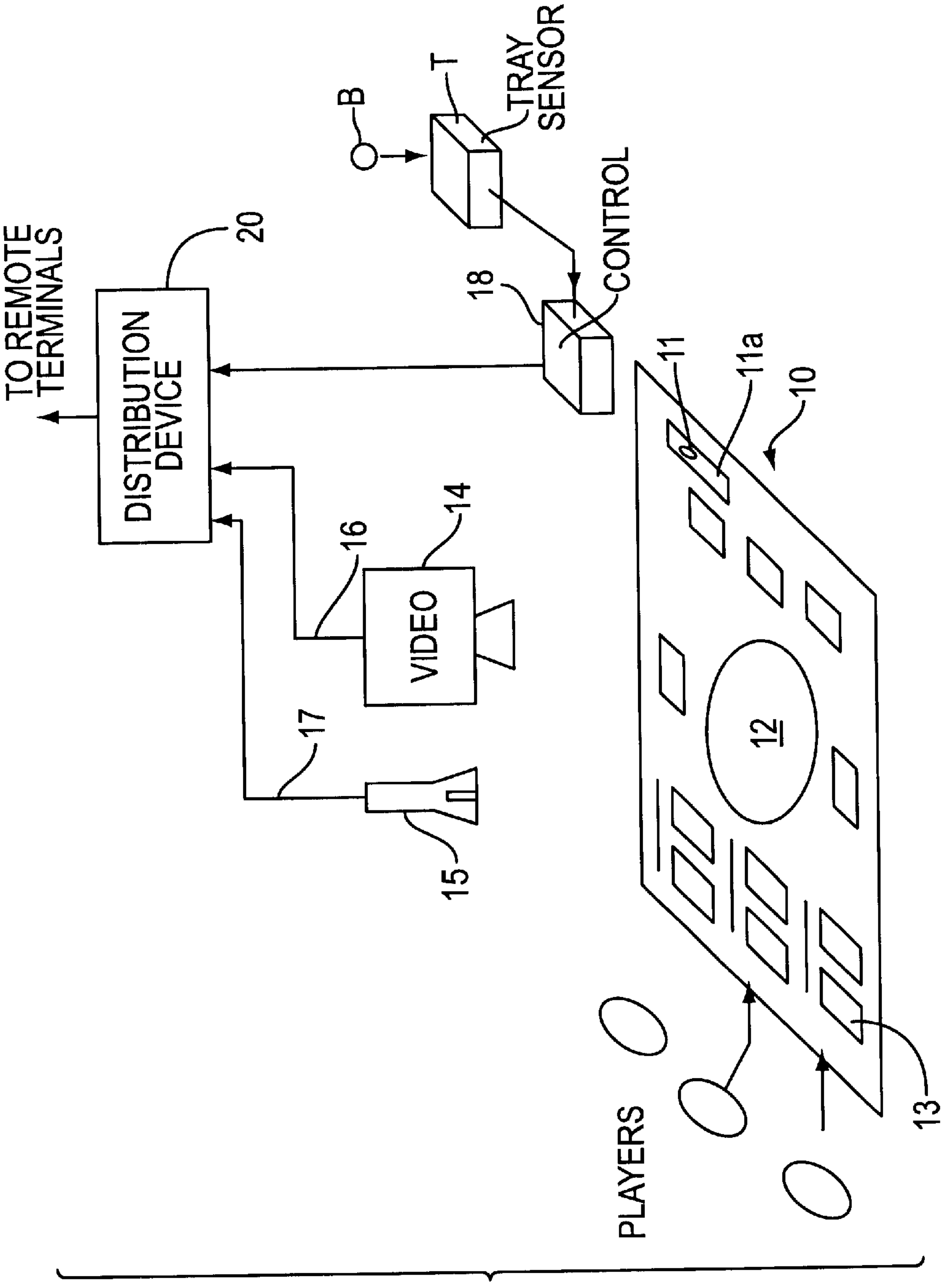
FIG. 1 is a schematic diagram of a roulette table in a casino with associated video camera and other parts of the system in schematic form.

FIG. 1 shows a conventional roulette table 10 that is in common use at a casino. While the preferred embodiment is described relative to a roulette table its principles are applicable to other table games such as blackjack, dice and baccarat. The table has the usual wheel 12 that is manually spun by a croupier into which a ball 11 is dropped at the beginning of the game. The ball 11 is usually placed in a tray 11*a* during the time it is not in use. A betting grid 13 is on the table, the grid containing the usual format of squares or rectangles with a number in each and other bet areas such as odd/even number, and red/black. A number of players stand or sit around the table. A player makes a bet by placing one or more chips of a given denomination on a number, intersection of corners, on red/black, etc.

Shown located above the table is a video camera 14, preferably one that is of the full color type. The camera 14 can be hidden, as are many cameras in a casino used for surveillance purposes, or can be a stand alone visible type if, for example, the presence of the remote play feature is to be advertised. It is preferred that the camera field of view is limited to the hands of the players as they place bets on the table and does not show the faces of the players. This is done to maintain privacy. A microphone 16 is also placed adjacent the table to pick up the "crowd noise" of the players. The microphone can be directional to pick up the sound of the spinning wheel and ball.

The output cable 16 of the camera 14 and the output cable 17 of the microphone 15 are shown. These are connected to a distribution device 20 at a suitable location that includes the type of broadcast facility that is to be used for the system. For example, if the game is to be used only with remote terminals at the casino, then there would be a type of a closed circuit TV system. If the camera and audio output is to be broadcast over the Internet, then there would be a suitable transmitter such as by "streaming video" and "streaming audio". If broadcast is to be by satellite then there would be communication such as by digital transmission.

Also associated with the table 10 is a control box 18. This is to be used to indicate specific events of a game during its play, such as start of a game and the close of betting for a game, that is, betting status signals. The control box 18 can be actuated in a suitable manner, such as manually actuated by the croupier, voice actuated and actuated at a remote location such as by an operator at a central location that monitors play at a table. In a preferred embodiment the control box 18 can be associated with physical devices such as, for example, a tray T in which the game ball B is placed and which has a micro switch or other type of sensor. Placing the ball in the tray triggers a signal that indicates the start of betting for a new game and removing the ball from the tray to place it in the wheel triggers a signal that the betting for the game is terminated. The close of betting also can be indicated by a motion detector or the video camera each for sensing start of spinning of the wheel and opening of betting for a new game by sensing the wheel stopping its rotation. These betting status signals are transmitted via the distribution device 20 to the remote terminals.

Figure 2:
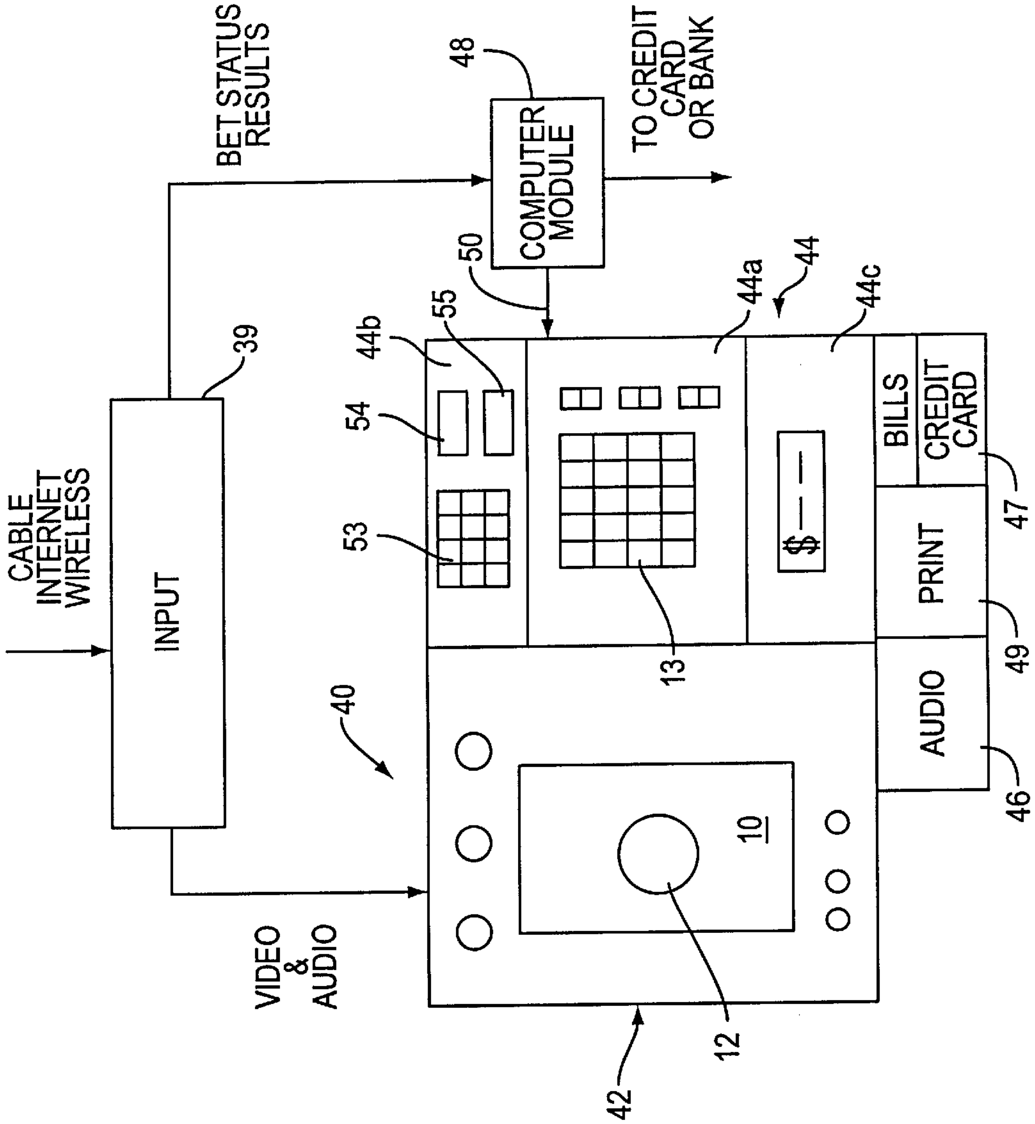
FIG. 2 is a schematic diagram of a terminal, computer or TV type of display.

FIG. 2 shows a remote terminal 40 for use at a casino or other location. The terminal 40 has an input section 39 that receives the video and data signals originating from the table. Terminal 40 includes a video display 42 which receives the video pictures of the table 10 action broadcast from the casino camera 14. There is also an audio module 46 that has a speaker and suitable volume control to play the sounds picked up from the casino table by the microphone and other audio information, as described below. The picture of the game being played at the table and the table sound are features that add to more realism for the player who is playing the game remote from the casino table.

Terminal 40 also includes a computer module 48 which has a microprocessor and a memory. The computer module preferably is of the type that makes the terminal 40 self-contained. That is, it has an application program that can generate various displays, perform the necessary computation for the odds of playing a game, and for keeping a running account of the wins and losses of the player. The terminal computer module 48 receives the betting result and betting status data type signals produced at the table 10.

Remote terminal 40 also includes a display 44 which basically comprises three sections. The display 44 is controlled by the terminal computer module 48 and a connecting communication line 50 between the two is shown. The display 44 essentially is an electronic table having features that corresponds to the actual casino table.

The display 44 has a section 44*a* that displays a computer module 48 generated simulation of the table betting grid. This section also can display other information such as the odds for various bets and bet combinations. The latter type of information can be displayed continuously or only on demand.

The second section 44*b* of the display 44 is a touch type screen that has a numeric keypad 53 with the usual 0–9 numbers, a touch type Enter key 54 and a display window 55 that displays data that has been entered. As part of a menu on the touch screen 44*b* is a set of keys for the selection of the type of bet, that is, straight number, combination of numbers, red/black and odd/even. The third section 44*c* displays the account balance of the player. All of the sections of the display 44 are generated and controlled by the terminal computer module 48.

The terminal 40 audio module 46 also interacts with the computer module 48. The audio module can be used to play information to help the player place his bets. For example, it can give messages of a new game starting, place your bet on grid number(s), place amount of bet and betting closed. Instead of the audio messages, the messages can be displayed on any one of the sections of display 44 and there can be a combination of audio and visual messages.

A bill acceptor 47 is also part of the terminal 40. Here the player inserts bills of currency to build up credits in his/her account. The bill acceptor accepts currency of the type used at the casino or other type and of one or more denominations. Devices of this type are well known. As the player inserts one or more bills into the acceptor to open his account, the value is displayed in the display section 44*c*. The acceptor 47 also can be replaced by a credit card reader or one can be provided in addition to the acceptor.

The remote terminal 40 also has an internal printer 49. When the player completes play at the terminal, he can request a printout of his account which is provided by the printer 49. This can be presented to a cashier at the casino to be redeemed for cash or chips when there is a positive balance. If the player is playing via a credit card, he can request from the terminal that winnings in his account as stored in the computer module 48 be electronically credited to his credit card account at a credit card company or bank. A player can obtain cash from a credit card, such as from an ATM machine. Printers and data communication with a credit card company and bank are well known techniques.

In the operation of a remote terminal 40 for a new player, the player inserts bills into the acceptor 47 or uses a credit card. This opens the terminal and the amount of the account is displayed on section 44*c*. The player then selects a preferred bet amount, that is, the base amount of a bet such as would correspond to a chip. For example, if a player opens an account for $100 and a preferred bet amount of $5, he would have the equivalent of 20 $5 chips if actually playing at the casino table. A stack or stacks of electronic chips of the proper amount and values can be displayed such as on the electronic betting grid section 44*a*. The value of a chip can be any amount, for example, even as small as 25 cents. The small betting amounts usually are not permitted at the casino table which often has a minimum bet of $5 or $10. The remote terminals expand the customer base and the amount that the casino owner or game operator can make during game play.

The player views the play in process at the casino table on the video display 42 and can play along with the play at the casino. The video display 42 preferably is left on at all times to attempt to induce play at a terminal.

The player is advised that a new game is to start and to place his bet. The start of a new game message, either audio or visual, is triggered from the control box 18 associated with the casino table. For example, as the ball 11 is placed in the tray 11*a* at the casino table or the spinning of the wheel stops, the distribution device at the casino broadcasts this to the remote terminals. The player enters his bet via the touch screen 44*b*. That is, the player selects whether it is a straight number, combination or other type of bet. Different types of bets can be made, like playing at the casino table. At the time of placing a bet the player can consult the betting grid in display section 44*a*. Instead of a touch type screen section 44*b* to designate the number(s) or other type of bet, numbers can be selected by a computer mouse point and click arrangement on the electronic grid table 44*a*. This is of use particularly where the terminal is a PC or other device that is off the casino physical site. In a PC or similar device, a part of the display screen can be used for the video display and another part for the computer generated functions, such as the betting grid. In a device using an AOLTV or WEBTV converter box or similar device the display screen of a television screen would be similarly divided.

The type of bet selected is displayed in window 55. The player enters the number or grid intersection numbers if the bet is a combination. This is also displayed in window 55. The number, intersection, red/black or odd/even bet also is displayed on the electronic betting grid section 44*a*. The player then enters the amount of the bet which also is displayed in window 55. The amount of the bet also can be displayed on the betting grid section 44*a* such as by showing the stacking of the electronic chip or chips of the selected amount at the proper location of the grid. The chips that are bet are removed from the player's purchased stack of electronic chips.

The complete bet is displayed in window 55. If it is acceptable, the player touching the Enter key 54. If not acceptable, the bet is cancelled by touching a key on the keypad 53, such as the star key, or a special Cancel key provided in section 44*b*. At this time the bet data is entered in the memory of the terminal computer module 48. If a mouse is used, there would be a point and click at an Enter or cancel box displayed on the screen.

The player can place additional bets for the game until a signal originating from the control box 18 at the casino game table, such as by removing the ball 11 from the tray 11*a* or the start of the wheel spinning, indicates that the betting is closed for the present game. The computer 48 at the remote terminal is locked out from accepting any more bets. This can be indicated to the player at the remote terminal by one or both of an audio and computer generated visible message. During the time allotted for making bets the player at the terminal can watch the action of the players and the bets placed at the casino table 10.

The game is played at the casino table 10 and the players at both the casino and at the remote terminals watch the wheel spinning and the ball dropping. The sounds at the table also are broadcast to the players at the remote terminals. The game result, that is, the winning number of the pocket into which the ball dropped and its color, is sent from the casino distribution device 20 to the individual remote terminals. The computer module 48 at a remote terminal 40 uses the game result and the bet(s) placed information to compute whether there was a loss or a win. If a loss, the computer subtracts the amount of the bet from the player's account. If there was a win, the remote terminal computer module 48 computes the amount of the win in accordance with the odds of the type and the amount of the bet. That is, each of straight number and number combination have different odds and red/black and odd/even have the same odds but different from the number type bets. The computer 48 has a program that provides for this calculation. The calculated win amount is then credited to the player's account. The account amount is displayed in the display section 44*c*.

As can be seen, a player at a location remote from the actual casino table can follow an actual game and can experience much of the actual casino player reaction and sounds. This makes the remote player's participation in playing much more realistic and interesting.

The foregoing description is based on a standard casino setting, such as found in Nevada and New Jersey U.S.A. It also applies to private casinos. That is, a religious or veterans organization holds a gambling night. The roulette table and camera would be brought to the location of the organization as well as remote terminals and communication apparatus. The remote terminals can be placed throughout the location for those who like to play alone or to handle any overflow.

The invention is described relative to a roulette table but has application to other casino table play type games. For example, there can be a dice table at the casino which has the camera and microphone described above. Here, the remote terminal would have a video display of the casino dice table and a compute generated representation of the table. The player at the remote terminal places a bet and plays along with the player at the casino. Here also, appropriate betting status signals are sent to the remote terminals to designate the opening and closing of betting, placing additional bets and results of the game. As before, a program in the remote terminal computer module calculates the winning based on house or other odds and credits this to the remote terminal player's account. Losses are subtracted.

The remote terminal video display of actual game concept is also applicable to card games such as blackjack, poker and baccarat.

A separate remote terminal can be provide for each type of game or a single universal terminal can be provided for two or more of the table games.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. A system for players using terminals at sites remote from a casino type location to play along with a table game at such casino type location comprising:

a camera at the location to view the game action and means at the location for producing wagering status signals and game result data;

distribution means for broadcasting from the location to the remote terminals the output of the camera view, a status signal that wagering on a game is terminated and the result data of the game played at the location;

each said remote terminal comprising;

(a) a receiver for receiving the camera view, the wagering termination status signal and the game result data broadcast from the location, (b) a video display for displaying the view of the table action viewed by the camera, (c) means including computer means for generating and for displaying an electronic representation of the game being played for placing wagers on the game being played, and (d) computer means for managing the account of the player and responsive to the received game result data for computing winning amounts based on the amount of the wager placed on the game being played and betting odds data stored at said computer means and losses based on the amount of the wager placed, and for updating the account of the player at the respective remote terminal based on winning amounts computed by said computer means and the losses.

2. The system as in claim 1 wherein said remote terminal further comprise a means for establishing a betting account for the player at the remote terminal without communication from the terminal to the location.

3. The system as in claim 2 wherein said means for establishing a betting account includes one of a currency acceptor or credit card reader.

4. The system as in claim 1 wherein said means at the location for producing wagering status signals produces signals representing the close of wagering on a game and the start of playing of a new game.

5. The system as in claim 4 wherein said means for producing wagering status signals includes a means for sensing the placement of a component of the game being played at the location.

6. The system as in claim 5 wherein the game played at the location is roulette and the game component is the ball to be placed in the roulette wheel.

7. A system as in claim 1 wherein said distribution means from the location to said remote terminals includes one of wireless, satellite and the Internet.

8. The system as in claim 1 wherein the game played at the location is roulette.

9. The system as in claim 1 further comprising at a terminal a means for communication between the terminal and a financial institution for transferring funds between the financial institution and the terminal to the account of the player that is active at the terminal.

10. The system as in claim 1 wherein said distribution means further broadcasts to the remote terminals a betting status signal indicating the start of wagering for the next game and said computer means of a remote terminal preventing betting at the remote terminal during the time between the status signals of wagering on one game being terminated and the start of wagering for the next game.

11. The system as claimed in claim 1 wherein said distribution means broadcasts from the location to all remote terminals without the remote terminals having to send any signal to the location.

12. The system as claimed in claim 1 wherein each said remote terminal only receives the named signals from the remote location and does not communicate back to the remote location to wager on a game.

13. The systems as claimed in claim 1 wherein said computer means of each said remote terminal internally computes the amount of a win.

14. A method for players at terminals at sites remote from a casino type location to play along with a table game at such casino type location comprising steps of:

viewing the game action with a camera at the location;

broadcasting from the location to a remote terminal for a remote player the output of the camera view and the results of the game played;

receiving at the remote terminal the view broadcast from the location and displaying at the remote terminal the view of the table action viewed by the camera;

maintaining at the remote terminal an account for the player playing at the terminal and a stored table of betting odds;

placing a wager at the remote terminal on the game being played; and receiving at the remote terminal the game results broadcast from the location;

computing at such remote terminal by a self-contained computer means the results of the wager based on the amount of the wager placed, the received results of the game and the stored table of betting odds; and updating at the remote terminal the account of the player based on the computation.

15. The method as in claim 14 further comprising the step of broadcasting to the remote terminals betting status signals indicating the close of betting of one game and the start of betting for the next game and preventing betting at the remote terminal during the time between the signals.

16. The method as in claim 14 further comprising the step of displaying an electronic representation of a betting grid at the remote terminals and the step of placing a wager includes actuating a part of said betting grid.

17. The method as set forth in claim 14 further comprising the steps of providing communication between a remote terminal and a financial institution and transferring funds between the financial institution and the account of the player that is active at the terminal.

18. The method as claimed in claim 14 wherein in the step of broadcasting from the location to a remote terminal no communication is required from the remote terminal to the location in order for the remote terminal to wager on a game.

19. The method as claimed in claim 18 wherein in the step of computing a winning amount at a remote terminal the remote terminal the terminal only receives from the location the winning result of the game played.

* * * * *